Jan. 31, 1933. C. SHUGG ET AL 1,895,738
COMBINED HARD AND SOFT RUBBER ARTICLE
Filed May 9, 1930
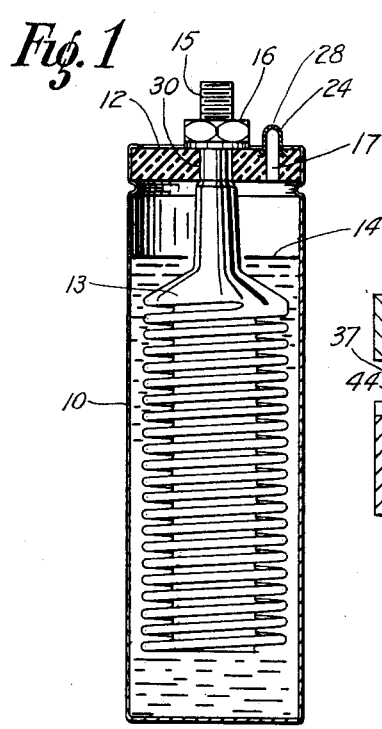
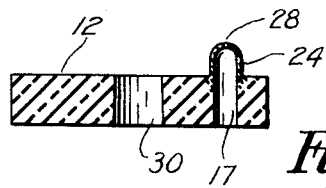
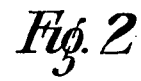
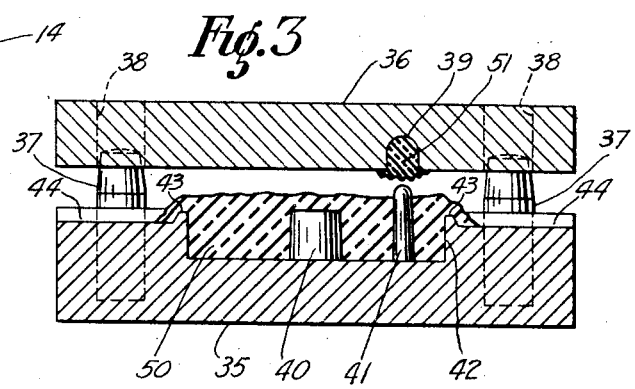
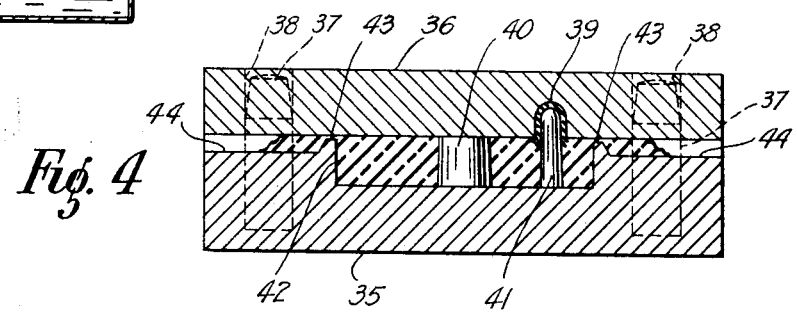
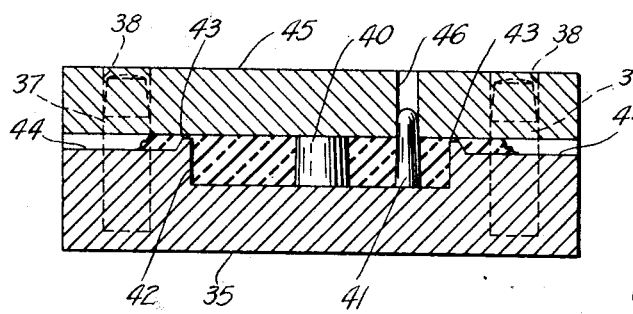
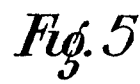
C. SHUGG & P. ROBINSON
INVENTORS
BY Dorsey & Cole
ATTORNEYS.

Patented Jan. 31, 1933

1,895,738

UNITED STATES PATENT OFFICE

CARLETON SHUGG AND PRESTON ROBINSON, OF NORTH ADAMS, MASSACHUSETTS, ASSIGNORS TO SPRAGUE SPECIALTIES CO., OF QUINCY, MASSACHUSETTS, A CORPORATION OF MASSACHUSETTS

COMBINED HARD AND SOFT RUBBER ARTICLE

Application filed May 9, 1930. Serial No. 451,029.

Our invention relates to the manufacture of rubber products of a unitary structure comprising rubber parts of different hardness.

We shall illustrate our invention in its application to a cover of an electrolytic device which cover is of hard rubber and is provided with a soft rubber vent. In electrolytic devices and especially electrolytic condensers, it is ordinary practice to place between the electrodes of different polarity, an insulator which also serves as the cover and for this combined purpose hard rubber is found to be a very suitable material.

Since the passage of current in electrolytic condensers and like devices generates gas, provision is made for the venting of the gas to the outside, however, such vents should prevent the upward flow of the electrolyte when the device is in an inverted position, and for this purpose, a check valve is used as a rule. A well known form of such a check valve is a soft rubber nipple, perforated by a needle in such a manner as to accomplish the above desired results.

To apply such a soft rubber nipple to a hard rubber cover, various arrangements have been used in the past, as for instance, inserting a knob in the cover or making it a part thereof and stretching the nipple over the knob. Such a joint between the cover and the nipple, however, has the disadvantage of low mechanical strength and a tendency to leak. This leakage is due primarily to the phenomenon characteristic of all electrolytic apparatus, namely, that the salt dissolved in the electrolyte rises out of the solution and creeps up along the walls of the device and in the case of a joint, as above described, finds its way out. Cementing of the nipple to the knob increases the mechanical strength, but the same disposition towards leakage due to creepage exists.

To circumvent difficulties which arise in the above described case, as well as in similar cases, we have conceived a novel method whereby in the process of their manufacture the soft and hard rubber parts are joined together in an integral piece. Our method produces a joint which is mechanically strong and not susceptible to leakage, and at the same time both the hard and soft rubber parts retain their desired characteristics.

It is thus the object of our invention to produce an article of rubber having portions of soft rubber and portions of hard rubber, whereby the two portions form an integral piece.

A further object is to produce a rubber article as above, in which the joint of the two portions of different characteristic is mechanically strong and impermeable to leakage.

A further object is to produce a rubber article, as above, in which the hard rubber and soft rubber portions retain their desired characteristics.

In the drawing, which forms part of this specification, Figure 1 is a side elevation, partly in section, illustrating an electrolytic condenser provided with a cover embodying our invention.

Fig. 2 is an enlarged section of the cover, shown in Fig. 1.

Fig. 3 is a longitudinal section of a two-part mold for the manufacture of the cover of Fig. 2, whereby the molds are shown before the hard and soft rubber portions are pressed together.

Fig. 4 is a longitudinal section of the two-part mold of Fig. 3, showing the cover of Fig. 2 in the process of manufacture after the two parts are pressed together.

Fig. 5 is a side elevation, partly in section, of a two-part mold for the hard rubber cover in case a modified process of our invention is used, in which the hard rubber part is subjected, before its final curing, to a preliminary partial curing.

As it is well known in the art, hard rubber and soft rubber have, as primary constituents, latex and sulphur; these being mixed together, whereby certain accelerators and anti-oxidants are added. The mix so obtained is compressed under heat in a suitable mold and under the influence of the heat and pressure, the sulphur chemically combines with the latex. This process is usually referred to as curing.

The ultimate character of the product is mainly determined by the percentage of sulphur primarily added to the mix, and thus to obtain a hard rubber article a mix of high percentage sulphur is prepared, while to obtain a soft rubber article a much lower percentage of sulphur is used in the mix. If an intermediate amount of sulphur is added, a rubber of intermediate hardness is obtained. Rubber of such intermediate hardness, however, may also be obtained by adding sufficient sulphur to produce a hard rubber, but interrupting the curing process before sufficient time has elapsed for the sulphur to combine fully with the latex.

In an electrolytic device, as for instance, shown in Fig. 1, which comprises two electrodes namely, a hollow metal spiral 13 immerged in an electrolyte 14 and a cylindrical metal container 10, a hard rubber disc 12 is used both for the insulation of the two electrodes from each other, as well as to form the cover of the device. The threaded end 15 of the electrode 13 projects through a hole 30 of the cover and is provided with a nut 16 to form one of the outside terminals of the condenser, the other terminal being the container 10. Suitable means are provided (not shown) to prevent leakage of the electrolyte between both the inside and outside electrodes and the cover.

To provide for a convenient vent for the gases liberated during the operation of the electrolytic device, a soft rubber valve or nipple 24 with a hole 28 is provided on the cover 12, said valve 24 and cover 12 forming an integral part in accordance with our invention, as will be now described.

As stated above, to provide for a strong mechanical joint between the hard rubber cover and the soft rubber nipple and to prevent leakage of the electrolyte, the two rubber parts are formed to constitute an integral structure. For this purpose, we provide two separate mixes, one of which when cured will produce hard rubber and the other soft rubber. In the mix for the cover, we use a high percentage of sulphur and a very rapid accelerator, such as diphenyl-guanidine, and omit the anti-oxidants. In the mix for the nipple, we use a low percentage of sulphur together with anti-oxidants and a very slow accelerator, or no accelerator at all.

The composition of the mixes are so selected that when the two mixes are subjected to a common curing process of a predetermined duration and temperature, the first mix cures rapidly and produces a hard rubber of low free-sulphur content, while the second mix due to the absence of the accelerator, cures slowly and its resilient qualities will not be impaired by the action of heat due to the presence of anti-oxidants.

Referring now to Fig. 3, there is shown a two-part steel-mold, the lower part 35 of which forms the mold proper, and the upper part a top plate 36. The two parts are interconnected by guide pins 37 inserted in the mold 35 and engaging corresponding guide holes 38 of the top plate 36; three guide pins are provided of which two are shown in Fig. 3.

The mold 35 is provided with a cavity 42 conforming to the shape of the cover 12. Projecting from the bottom of the cavity 42 is a central pin 40 and an eccentrically located pin 41; the pin 40, the height of which corresponds to the depth of the cavity 42, serves to form the center hole 30 of the cover, while the pin 41 which projects beyond the top of the mold 35 serves to form the vent passage 17 of the cover and also, as will be shown hereafter, as the core for the nipple 24.

The cavity 42 is connected by means of recesses 43—43 to radial grooves 44—44 which are provided in the upper face of the mold 35 and extend to the periphery of the mold.

The hard rubber mix 50 for the cover is inserted in the cavity 42.

The top plate 36 is provided with a recess 39 adapted to receive the soft rubber mix 51 for the nipple 24.

It should be understood that the mixes 50 and 51, in their initial condition, form a plastic viscous putty which can be easily forced in and substantially fill out the cavities 42 and 39 respectively.

It should also be understood that the amount of the mixes is slightly in excess of that required to fill out the cavity 42 and the recess 39 respectively, whereby when the two parts 35 and 36 of the mold are brought together, the excess material is forced out through the recesses 43—43 and the grooves 44—44.

After the mixes have been properly inserted in the mold and the parts 35 and 36 brought in juxtaposition, the top plate 36, (which is preferably the moving part of the mold), under application of heat, is pressed against the part 35, whereby the pin 41 projecting in the mix 51, causes the latter to assume the shape of a hollow cup.

The application of the pressure for a predetermined time and at a selected temperature causes the curing of the mixes 50 and 51, whereby when the curing operation is completed both the hard and soft rubber part will assume their required characteristics in the same way as would be obtained if the parts would be cured in a separate curing process. However, as the mixes are gradually cured, some diffusion of sulphur from the hard to the soft rubber takes place at the boundary of the two mixes, so that the hard rubber is considerably softened by comparison with the rest of the hard rubber and the soft rubber is considerably hardened by comparison with the rest of the soft rubber.

The boundary thus represents a rubber of intermediate quality, which is of an intermediate hardness and provides for a progressive transition between the two rubbers of strongly different characteristics, the hardness decreasing progressively from the hard to the soft rubber.

It has been found that this rubber of intermediate hardness provides for a homogeneous seal between the hard and the soft rubber which is uniform, mechanically strong, and impermeable to leakage.

It should be understood that the ingredients are so mixed and the curing process so controlled that the diffusion or migration of sulphur does not proceed to the extent that the nipple itself becomes hard.

Instead of curing the hard and soft mixes in a single process, as above described, it is also possible to sub-divide the curing of either or of both mixes into two steps. For instance, the hard rubber mix for the cover may be subjected to a preliminary partial curing before its final curing with the soft rubber mix.

For this purpose a two-part mold, as shown in Fig. 5 is used. The lower part 35 of this mold is identical with the one shown in Figs. 3 and 4. However, the top plate 45 is provided with a bore 46, instead of the recess 39, whereby when the two parts of the mold are brought together the pin 41 projects in the bore 46. The hard rubber is cured in this mold to an intermediate hardness and subjected to a final curing together with the soft rubber mix in a mold as shown in Figs. 3 and 4.

It should be well understood that when using such a partial curing process for the hard rubber mold, the mixes are so selected that the curing time required for the hard rubber is greater than that of the soft rubber, and the curing of the hard rubber thus divided in two suitable steps.

It is also feasible to subject only the soft mix to a preliminary partial curing process. In this case the mixes are so selected that the soft rubber mix requires a longer curing time than the hard rubber mix.

Finally it is also feasible to subject both mixes to a preliminary partial curing process. In this case there might or might not be a difference in the curing time of the two mixes, as such partial curing may be also undertaken for using different curing temperatures in the partial curing process of the two mixes.

It should be well noted that whenever a partial curing process is applied in any of the ways suggested above, such curing should not be carried too far, as otherwise no satisfactory joint will be obtained in the final curing process.

While we have described and illustrated our invention on hand of a specific application thereof, it should be well understood that our invention has a wide field of application, wherever it is advantageous to combine soft and hard rubber parts in an integral structure and therefore we do not wish to be limited to the structure shown and the process described above, but desire the appended claims to be construed as broadly as permissible in view of the prior art.

What we consider as new and desire to secure by Letters Patent is:

1. In the manufacture of rubber articles, a process which comprises the simultaneous curing of two mixes, one comprising a high percentage of sulphur, a rapid accelerator and no anti-oxidants, and the other comprising a low percentage of sulphur, a slow accelerator and anti-oxidants, joining together said mixes during the curing process by means of homogeneous joint of intermediate sulphur content, said joint being impermeable to leakage.

2. In the manufacture of rubber articles, a process which comprises the mixing of two mixes, one to obtain hard rubber and the other to obtain soft rubber, subjecting one of the mixes to a partial curing process, subjecting the partially cured mix and the other mix to a simultaneous curing process and joining said two mixes during said second curing process so as to form an integral piece, by a joint of intermediate hardness.

3. In the manufacture of rubber articles, a process which comprises the mixing of two mixes, one to obtain hard rubber and the other to obtain soft rubber, subjecting the hard rubber mix to a partial curing process, subjecting the soft rubber mix to a partial curing process and subjecting the two partially cured mixes to a common curing process and joining said two mixes together during said common curing process.

CARLETON SHUGG.
PRESTON ROBINSON.